US008393295B2

(12) United States Patent
Esch et al.

(10) Patent No.: US 8,393,295 B2
(45) Date of Patent: Mar. 12, 2013

(54) ERGONOMIC ENTRANCE LANE FOR A MILKING PLATFORM

(76) Inventors: Anthony T. Esch, Dodgeville, WI (US); James D. Siddell, Waunakee, WI (US); Paul A. Larmour, Jr., Evansville, WI (US); David A. Reid, Hazel Green, WI (US); Parimal G. Rajkondawar, Madison, WI (US)

(*) Notice: Subject to any disclaimer, the term of this patent is extended or adjusted under 35 U.S.C. 154(b) by 366 days.

(21) Appl. No.: 12/816,451

(22) Filed: Jun. 16, 2010

(65) Prior Publication Data
US 2011/0308466 A1   Dec. 22, 2011

(51) Int. Cl.
*A01J 5/00* (2006.01)
(52) U.S. Cl. .................. 119/14.02; 119/14.04
(58) Field of Classification Search .... 119/14.01–14.04, 119/14.18, 516, 520, 521, 522, 523, 524
See application file for complete search history.

(56) References Cited

U.S. PATENT DOCUMENTS

| 3,116,713 | A | * | 1/1964 | Darling | 119/14.04 |
| 3,765,373 | A | * | 10/1973 | Phillips | 119/14.04 |
| 3,835,814 | A | * | 9/1974 | Jacobs et al. | 119/14.04 |
| 5,784,993 | A | * | 7/1998 | Osthues et al. | 119/14.04 |
| 6,341,582 | B1 | * | 1/2002 | Gompper et al. | 119/840 |
| 6,571,730 | B1 | * | 6/2003 | Norberg | 119/14.03 |
| 8,074,600 | B2 | * | 12/2011 | Kallen et al. | 119/14.04 |
| 2002/0033138 | A1 | * | 3/2002 | Brayer | 119/14.03 |
| 2009/0145364 | A1 | * | 6/2009 | Hardy et al. | 119/14.04 |
| 2010/0307420 | A1 | * | 12/2010 | Axelsson et al. | 119/14.02 |

OTHER PUBLICATIONS

U.S. Appl. No. 13/050,238 entitled *Safety Pressure Sensor for a Milking Platform* in the name of Anthony T. Esch, et al.; 30 total pages, filed Mar. 17, 2011.

* cited by examiner

*Primary Examiner* — Rob Swiatek
*Assistant Examiner* — Ebony Evans
(74) *Attorney, Agent, or Firm* — Baker Botts L.L.P.

(57) ABSTRACT

A system includes a first wall positioned substantially parallel to a second wall, a first end of the first wall and a first end of the second wall defining an entrance to a milking platform entrance lane having a width in the range of thirty inches to thirty-six inches. The system further includes a flare wall having a first end coupled to a second end of the second wall, the flare wall extending outwardly from the second wall at an angle in the range of thirty-five degrees to forty-five degrees with respect to the second wall. A second end of the flare wall and a second end of the first wall define an exit from the milking platform entrance lane having a width in the range of forty inches to fifty-four inches.

19 Claims, 4 Drawing Sheets

ERGONOMIC ENTRANCE LANE FOR A MILKING PLATFORM

TECHNICAL FIELD

This invention relates generally to dairy farming and more particularly to an ergonomic entrance lane for a milking platform.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems supporting dairy milking operations may be reduced or eliminated.

In certain embodiments, a system includes a first wall positioned substantially parallel to a second wall, a first end of the first wall and a first end of the second wall defining an entrance to a milking platform entrance lane having a width in the range of thirty inches to thirty-six inches. The system further includes a flare wall having a first end coupled to a second end of the second wall, the flare wall extending outwardly from the second wall at an angle in the range of thirty-five degrees to forty-five degrees with respect to the second wall. A second end of the flare wall and a second end of the first wall define an exit from the milking platform entrance lane having a width in the range of forty inches to fifty-four inches.

Particular embodiments of the present disclosure may provide one or more technical advantages. For example, the width of the entrance to the milking platform entrance lane (which is approximately the minimum width allowing a single dairy cow to comfortably walk) may encourage dairy cows to move through the entrance lane and toward the milking platform in a single file line. Accordingly, the likelihood of congestion within the entrance lane may be reduced (as compared to wider entrance lane designs). This reduction in congestion may increase the speed with which the dairy cows approach the milking platform and reduce stress levels in the dairy cows, both of which may increase the overall milk production of the milking platform. Additionally, because the flare wall may widen the milking platform entrance lane at its exit (to a width corresponding approximately one and a half times the width at the entrance), dairy cows passing through the entrance lane may be afforded additional room to line up with one or more stalls of the milking platform. This additional room may increase the speed and ease with which a dairy cow loads into a milking stall (particularly in embodiments in which the milking platform is a rotary milking platform). The increase in speed and ease of loading may further increase the overall milk production of the milking platform. Furthermore, in embodiments where the milking platform is a rotary milking platform, the increase in speed and ease of loading may decrease the likelihood that the rotary milking platform will need to be stopped to allow a dairy cow additional loading time, thereby reducing wear and tear on certain components of the rotary milking platform.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1A:
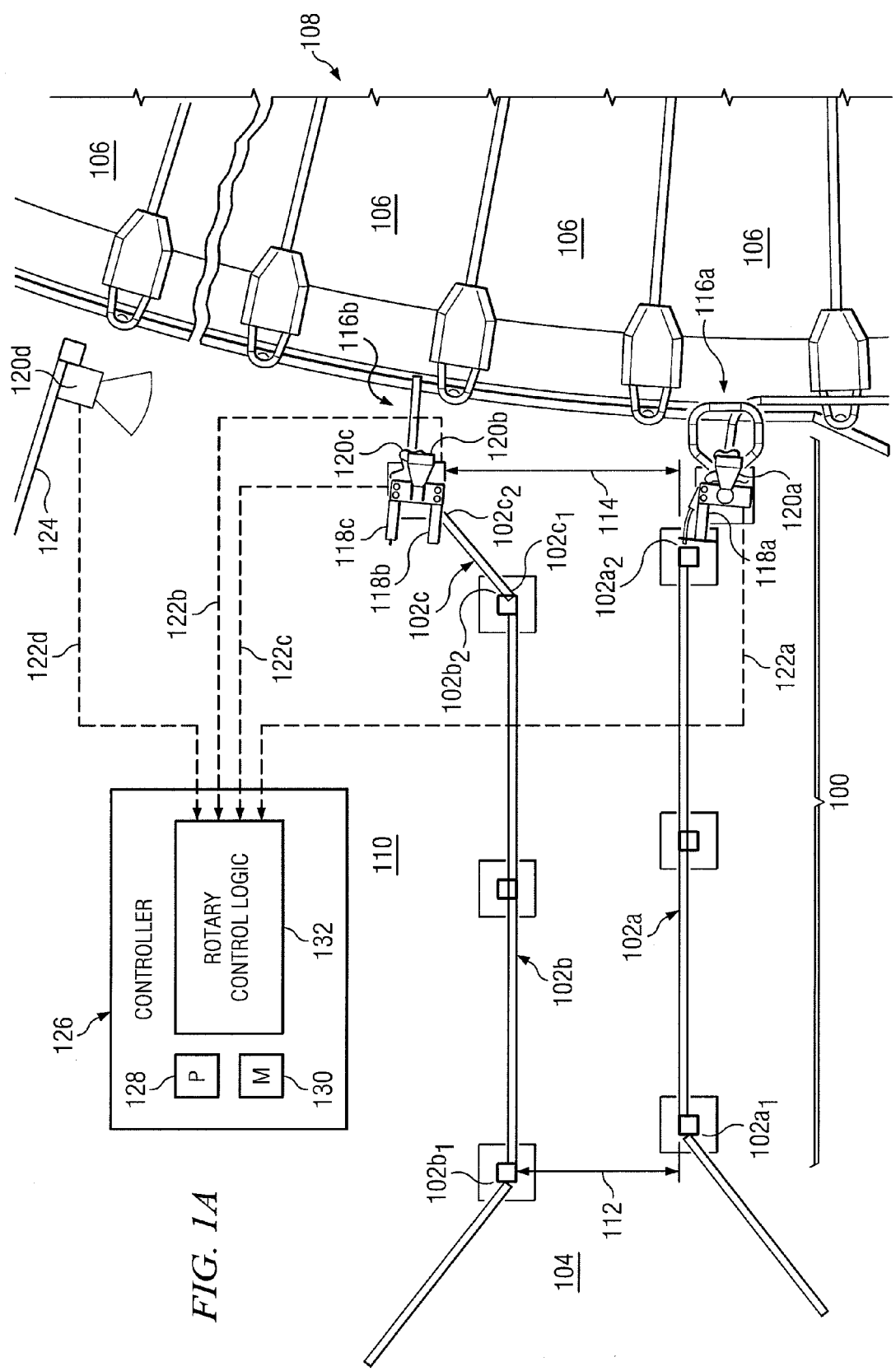
FIGS. 1A-1B illustrate top and perspective views of an example entrance lane for a milking platform, according to certain embodiments of the present disclosure.
Figure 1B:
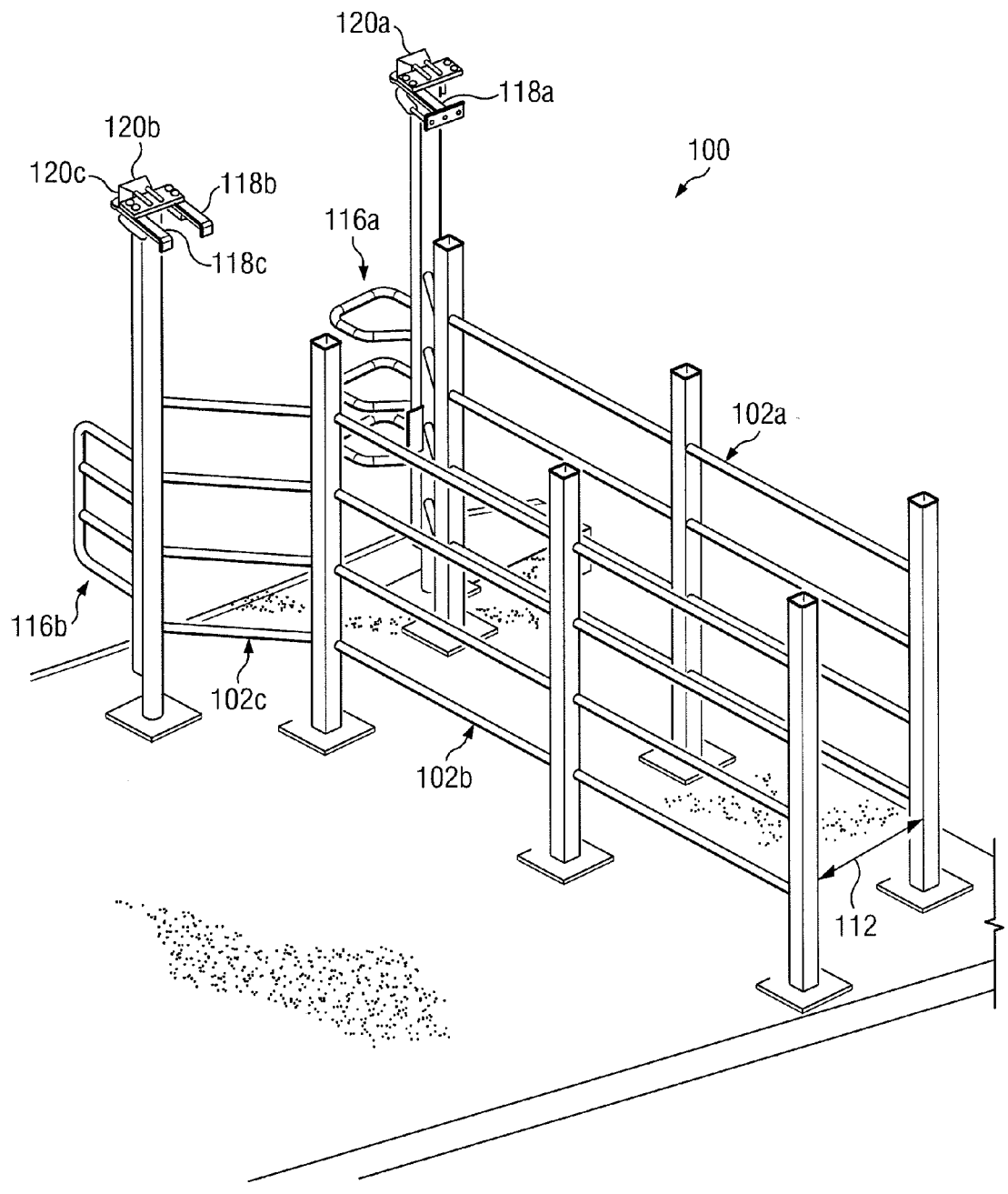

FIGS. 1A-1B illustrate top and perspective views of an example entrance lane 100 for a milking platform 108, according to certain embodiments of the present disclosure. Entrance lane 100 includes a number of walls 102 forming a pathway for dairy cows to move from a holding pen 104 to one or more stalls 106 of a milking platform 108. In general, a group of dairy cows are held in a holding pen 104 prior to being milked in the one or more stalls 106 of milking platform 108. By decreasing the effective area of holding pen 104 (e.g., using a crowd gate), the dairy cows are encouraged to pass one at a time though entrance lane 100 and into stalls 106 of milking platform 108.

In certain embodiments (e.g., as illustrated in FIGS. 1A-1B), milking platform 108 may comprise a rotary milking platform having a counterclockwise forward direction of rotation. In such embodiments, dairy cows in stalls 106 are milked as the stalls 106 rotate on a rotating platform, with the dairy cows being discharged into an exit pen 110 after the rotary platform completes a single rotation. Although the present disclosure contemplates milking platform 108 as being any suitable type of milking platform, it is assumed throughout the remainder of this description that milking platform 108 is a rotary milking platform (for purposes of simplicity).

Walls 102 of entrance lane 100 may each be constructed of any suitable materials arranged in any suitable configuration operable to encourage the orderly movement of dairy cows. For example, walls 102 may each include any number and combination of posts, rails, tubing, rods, connectors, cables, wires, and/or beams operable to form a substantially planar barricade such as a fence, wall, and/or other appropriate structure suitable to encourage the orderly movement of dairy cows. In certain embodiments, walls 102 may be constructed by extending a number of rails between adjacent posts such that the rails are flush with the posts along the interior portion of entrance lane 100. As a result, the posts forming walls 102 may not protrude into entrance lane 100 (as in certain conventional entrance lane configurations), thereby decreasing the likelihood of injury to or irritation of the dairy cows as they pass through entrance lane 100.

Walls 102 of entrance lane 100 may be oriented such that a first end $102a_1$ of a first wall $102a$ and a first end $102b_1$ of a second wall $102b$ form an entrance 112 to entrance lane 100 having a width corresponding to the width of a single dairy cow (e.g., thirty inches to thirty-six inches). In certain embodiments, a width corresponding to the width of a single dairy cow may be a minimum width allowing a single dairy cow to comfortably walk. First wall 102a and second wall 102b may be oriented substantially parallel to one another such that the portion of entrance lane 100 defined by first wall 102a and second wall 102b has a substantially uniform width. Additionally, a first end $102c_1$ of a flare wall 102c may be coupled to a second end $102b_2$ of second wall 102b. Moreover, flare wall 102c extends outwardly at an angle in the range of thirty-five degrees to forty-five degrees with respect to second wall 102b such that a second end $102c_2$ of flare wall 102c and a second end $102a_2$ of first wall 102a define an exit 114 to entrance lane 100 having a width corresponding to one and a half times the width of entrance 112 to entrance lane 100 (e.g., forty to fifty-four inches).

The above-described configuration of walls 102 may encourage dairy cows to enter entrance lane 100 one at a time, thereby reducing the likelihood of congestion within entrance lane 100. Additionally, the extra width at exit 114 from entrance lane 100 may afford the dairy cows additional room to line up with one or more stalls 106 of rotary milking platform 108, which may increase the speed and ease with which the dairy cows load into stalls 106. By reducing congestion and increasing speed and ease of loading, entrance lane 100 may increase the efficiency of the milking process, resulting in greater overall milk production.

Entrance lane 100 may additionally include a number of gates 116. Gates 116 may each be constructed of any suitable materials arranged in any suitable configuration operable to perform the functionality described below. For example, gates may each include any number and combination of rails, tubing, rods, connectors, cables, wires, and/or beams operable to perform the functionality described below. In certain embodiments (e.g., as illustrated in FIGS. 1A and 1B), entrance lane 100 may include a first gate 116a formed from a three-dimensional (e.g., D-shaped) arrangement of tubing material and a second gate 116b formed from a substantially planar arrangement of tubing material. First gate 116a may be coupled to the second end $102a_2$ of first wall 102a and second gate 116b may be coupled to second end $102c_2$ of flare wall 102c. Gates 116 may each be coupled to the corresponding walls 102 using any suitable hardware components such that the gates 116 may pivot about the point of attachment to walls 102.

In certain embodiments, a first actuator 118a may be coupled to first gate 116a, a second actuator 118b may be coupled to second gate 116b, and a third actuator 118c may be coupled to second gate 116b. Actuators 118 may each comprise any suitable configurations of springs and/or other materials permitting actuators 118 to impede rotational deflections of the gates 116 to which they are coupled. For example, actuators 118 may be configured to maintain gates 116 in a default orientation (i.e., an orientation in the absence of any external force being applied to gates 116, such as by a dairy cow). The default orientation of gates 116 may be an orientation in which gates 116 are oriented substantially parallel to a stall 106 located adjacent to exit 114 of entrance lane 100. Furthermore, each actuator 118 may be independently adjustable such that the force needed to overcome the impedance provided by each actuator 118 (i.e., the force required to move gates 116 from a default orientation) may be independently adjusted.

In certain embodiments, a first sensor 120a may be positioned proximate to first actuator 118a (e.g., by coupling sensor 120a to second end $102a_2$ of first wall 102a adjacent to actuator 118a), a second sensor 120b may be positioned proximate to second actuator 118b (e.g., by coupling sensor 120b to second end $102c_2$ of flare wall 102c adjacent to actuator 118b), and a third sensor 120c may be positioned proximate to third actuator 118c (e.g., by coupling sensor 120c to second end $102c_2$ of flare wall 102c adjacent to actuator 118c). Each sensor 120 may comprise any suitable device operable to generate a trigger 122 in response to a threshold amount of deflection of a gate 116 (the threshold amount of deflection of the gate 116 causing deflection of the actuator 118 coupled to the gate 116, which may in turn be detected by the sensor 120 positioned proximate to the actuator 118). A trigger 122 generated by a sensor 120 may be an electrical signal generated by the sensor 120, the interruption of electrical signal passing through sensors 120, or any other suitable trigger, according to particular needs.

The threshold amount of deflection gates 116 causing sensors 120 to generate triggers 122 may be independently adjusted (e.g., by adjusting the point at which each sensor 120 is coupled to a wall 102 relative to an actuator 118). As a result, sensor 120a may generate a trigger 122a in response to an amount of rotational deflection of gate 116a different than the amount of rotational deflection of gate 116b in the same direction that would cause the generation of a trigger 122b by sensor 120b. Additionally, sensor 120b may generate a trigger 122b in response to an amount of rotational deflection of gate 116b different than the amount of rotational deflection of gate 116b (in the opposite direction) that would cause the generation of a trigger 122c by sensor 120c.

In certain embodiments, a fourth sensor 120d may be coupled to a wall 124 of exit pen 110. Fourth sensor 120d may be coupled to an end of wall 124 nearest rotary milking platform 108. Sensor 120d may include any suitable sensor operable to generate a trigger 122 (i.e., an electrical signal generated by sensor 120d, the interruption of an electrical signal passing through sensor 120d, or any other suitable trigger 122, according to particular needs) in response to detecting the presence of a dairy cow within a predefined proximity of sensor 120d. For example, sensor 120d may be operable to generate a trigger 122 in response to detecting the presence of a dairy cow within six inches of sensor 120d (and, as a result, wall 124 of exit pen 110).

In certain embodiments, sensors 120 may each be communicatively coupled (e.g., via a network facilitating wireless or wireline communication) to a controller 126 such that triggers 122 generated by sensors 120 may be communicated to controller 126. Controller 126 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, controller 126 may include any suitable combination of software, firmware, and hardware. Controller 126 may additionally include one or more processing modules 128 and one or more memory modules 130. Processing modules 128 may each include one or more microprocessors, controllers, or any other suitable computing devices or resources and may work, either alone or with other components described herein, to provide a portion or all of the functionality described herein. Memory modules 130 may take the form of volatile or non-volatile memory including, without limitation, magnetic media, optical media, random access memory (RAM), read-only memory (ROM), removable media, or any other suitable memory component.

In certain embodiments, controller 126 may include rotary control logic 132. Rotary control logic 132 may include any information, logic, and/or instructions stored and/or executed by controller 126 to control the operation of (e.g., the starting and stopping of) rotary milking platform 108 in response to triggers 122 received from one or more sensors 120. For example, rotary control logic 132 may initiate stopping the rotation of rotary milking platform 108 (e.g., by communicating a signal to a rotary milking platform drive mechanism, such as a hydraulic motor) in response to receipt of a trigger 122a from sensor 120a, trigger 122a having been generated by sensor 120a in response to a threshold amount of rotational deflection of first gate 116a in a direction corresponding to the forward direction of rotation of rotary milking platform 108 (such as would be caused by a dairy cow contacting first gate 116a after having failed to timely enter a stall 106 of rotary milking platform 108).

Rotary control logic 132 may additionally initiate stopping the rotation of rotary milking platform 108 (e.g., by communicating a signal to a rotary milking platform drive mechanism, such as a hydraulic motor) in response to receipt of a trigger 122b from sensor 120b, trigger 122b having been generated by sensor 120b in response to a threshold amount of rotational deflection of second gate 116b in a direction corresponding to the forward direction of rotation of rotary milking platform 108 (such as would be caused by a dairy cow contacting second gate 116b after having failed to timely exit a stall 106 and enter exit pen 110).

Rotary control logic 132 may additionally initiate stopping the rotation of rotary milking platform 108 (e.g., by communicating a signal to a rotary milking platform drive mechanism, such as a hydraulic motor) in response to receipt of a trigger 122c from sensor 120c, trigger 122c having been generated by sensor 120c in response to a threshold amount of rotational deflection of second gate 116b in a direction corresponding to a reverse direction of rotation of rotary milking platform 108 (such as would be caused if an operator reversed the direction of rotation of rotary milking platform 108 causing a dairy cow that has failed to fully enter a stall 106 of rotary milking platform 108 to contact second gate 116b).

Rotary control logic 132 may additionally initiate stopping the rotation of rotary milking platform 108 (e.g., by communicating a signal to a rotary milking platform drive mechanism, such as a hydraulic motor) in response to receipt of a trigger 122d from sensor 120d, trigger 122d having been generated by sensor 120c in response to detecting the presence of a dairy cow within a predefined proximity of sensor 120d (such as would be caused if an operator reversed the direction of rotation of rotary milking platform 108 causing a dairy cow that has failed to fully exit a stall 106 of rotary milking platform 108 to contact wall 122 of exit pen 110).

By generating triggers 122 that cause rotary control logic 132 to initiate stopping of the rotation of rotary milking platform 108 (as described above), sensors 120 may decrease the risk of injury for dairy cows failing to timely enter and exit stalls 106 of the rotary milking platform 108. Furthermore, because both actuators 118 and sensors 120 may be independently adjusted (as described above), entrance lane 100 may be configured such that unnecessary stopping of the rotary milking platform 108 is minimized, thereby improving throughput, decreasing mechanical wear, and improving cow identification performance.

Although a particular implementation of entrance lane 100 is illustrated and primarily described, the present disclosure contemplates any suitable implementation of entrance lane 100, according to particular needs. Moreover, although entrance lane 100 is primarily described as forming a pathway for dairy cows to move from a holding pen 104 to one or more stalls 106 of a milking platform 108, the present disclosure contemplates entrance lane 100 forming a pathway for any suitable dairy livestock (e.g., cows, water buffalo, goats, etc.) to move from a holding pen 104 to any other location, such as to one or more stalls 106 of a milking platform 108. Moreover, in such alternative embodiments, entrance lane 100 may include dimensional changes corresponding to the size of the particular dairy livestock.

Figure 2:
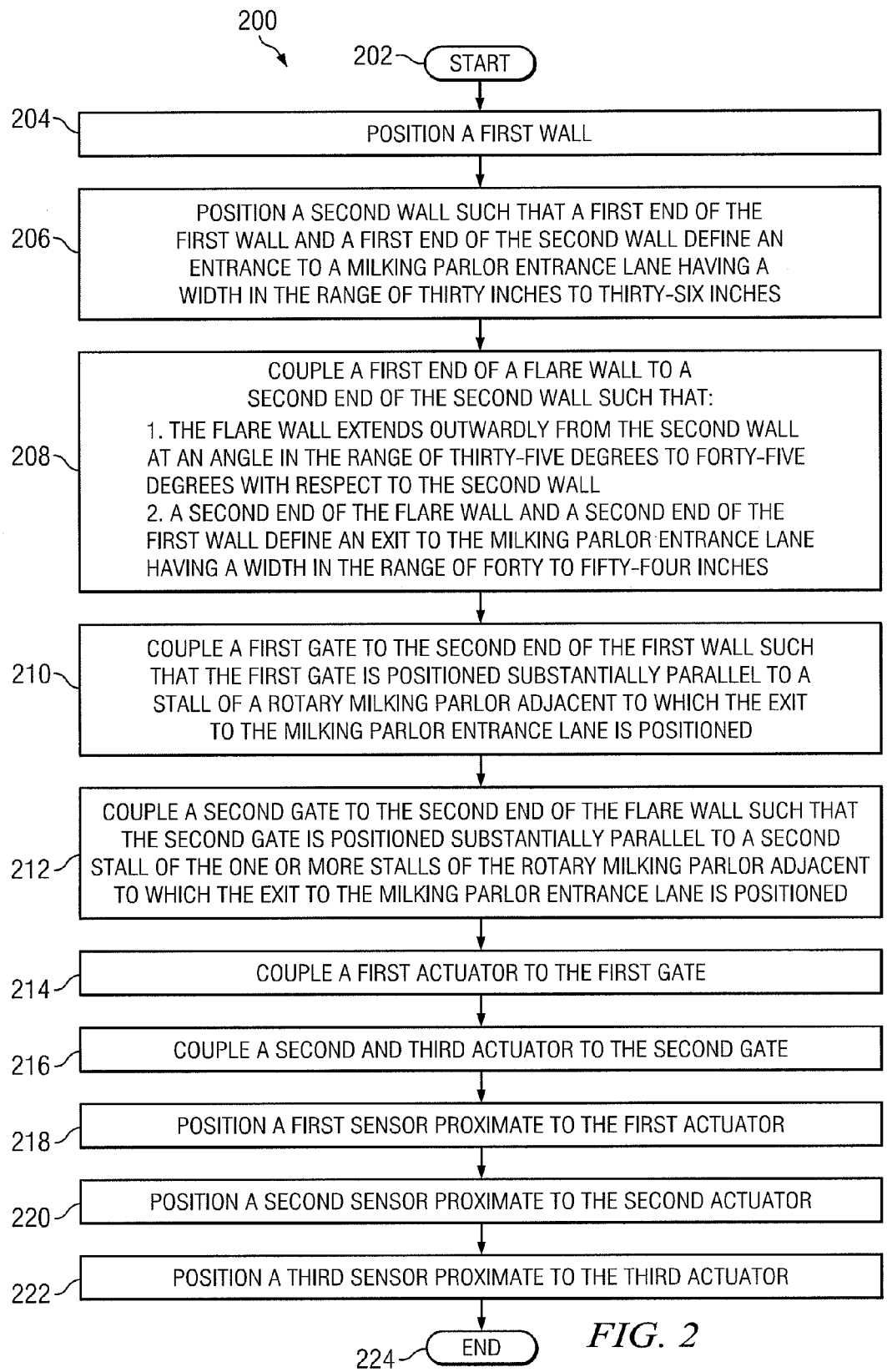
FIG. 2 illustrates an example method of installation of the entrance lane depicted in FIG. 1, according to certain embodiments of the present disclosure.

FIG. 2 illustrates an example method 200 for installation of entrance lane 100, according to certain embodiments of the present disclosure. The method begins at step 202. At step 204, first wall 102a is positioned. At step 206, second wall 102b is positioned such that first end $102a_1$ of first wall 102a and first end $102b_1$ of second wall 102b define an entrance 112 to entrance lane 100 having a width corresponding to the width of a single dairy cow (e.g., in the range of thirty inches to thirty-six inches). In certain embodiments, a width corresponding to the width of a single dairy cow may be a minimum width allowing a single dairy cow to comfortably walk.

At step 208, flare wall 102c is positioned with first end $102c_1$ coupled to second end $102b_2$ of second wall 102b. Flare wall 102c is positioned to extend outwardly from second wall 102b at an angle in the range of thirty-five degrees to forty-five degrees with respect to the second wall such that second end $102c_2$ of flare wall 102c and second end $102a_2$ of first wall 102a define an exit 114 to entrance lane 100 having a width corresponding to one and a half times the width of entrance 112 of entrance lane 100 (e.g., in the range of forty to fifty-four inches).

In certain embodiments, walls 102 may each be positioned by setting one or more posts in the ground (e.g., such that the posts are substantially vertical) and extending one or more rails between adjacent posts. The rails may extend between adjacent posts such that the rails are flush with the posts along the interior portion of entrance lane 100. As a result, the posts forming walls 102 may not protrude into entrance lane 100 (as in certain conventional entrance lane configurations), thereby decreasing the likelihood of injury to or irritation of the dairy cows as they pass through entrance lane 100.

At step 210, first gate 116a is coupled to second end $102a_2$ of first wall 102a such that first gate 116a is positioned substantially parallel to a stall 106 of rotary milking platform 108 (a stall 106 adjacent to exit 114 of entrance lane 100). At step 212, second gate 116b is coupled to second end $102c_2$ of flare wall 102c such that second gate 116b is positioned substantially parallel to a stall 106 of rotary milking platform 108 (a stall 106 adjacent to exit 114 of entrance lane 100). Gates 116 may be coupled to walls 102 using any suitable hardware operable to permit gates 116 to rotate about the point of attachment to walls 102.

At step 214, first actuator 118a is coupled to first gate 116a. At step 216, second actuator 118b and third actuator 118c are each coupled to second gate 116b. Actuators 118 may each be configured to maintain the above-discussed orientation of gates 116 with respect to stalls 106 of rotary milking platform 108. Furthermore, each actuator 118 may be independently adjustable such that the force needed to overcome the impedance provided by each actuator 118 (i.e., the force required to move gates 116 from a default orientation) may be independently adjusted.

At step 218, first sensor 120a is positioned proximate to first actuator 118a (e.g., by coupling first sensor 120a to second end $102a_2$ of first wall 102a at a point adjacent to first actuator 118a). At step 220, second sensor 120b is positioned proximate to second actuator 118b (e.g., by coupling second sensor 120b to second end $102c_2$ of flare wall 102c at a point adjacent to second actuator 118b). At step 222, third sensor 120c is positioned proximate to third actuator 118c (e.g., by coupling third sensor 120c to second end $102c_2$ of flare wall 102c at a point adjacent to third actuator 118c). Sensors 120 may each be independently adjusted (e.g., by adjusting the point at which sensors 120 are mounted relative to actuators 118) such that different threshold amounts of deflection of gates 116 may result in the generation of triggers 122, which may cause controller 126 to stop rotation of rotary milking platform 108. Because both actuators 118 and sensors 120 may be independently adjusted, entrance lane 100 may be configured such that unnecessary stopping of rotary milking platform 108 is minimized. The installation of entrance lane 100 is completed at step 224.

Although the steps of method 200 have been described as being performed in a particular order, the present disclosure contemplates that the steps of method 200 may be performed in any suitable order, according to particular needs.

Figure 3:
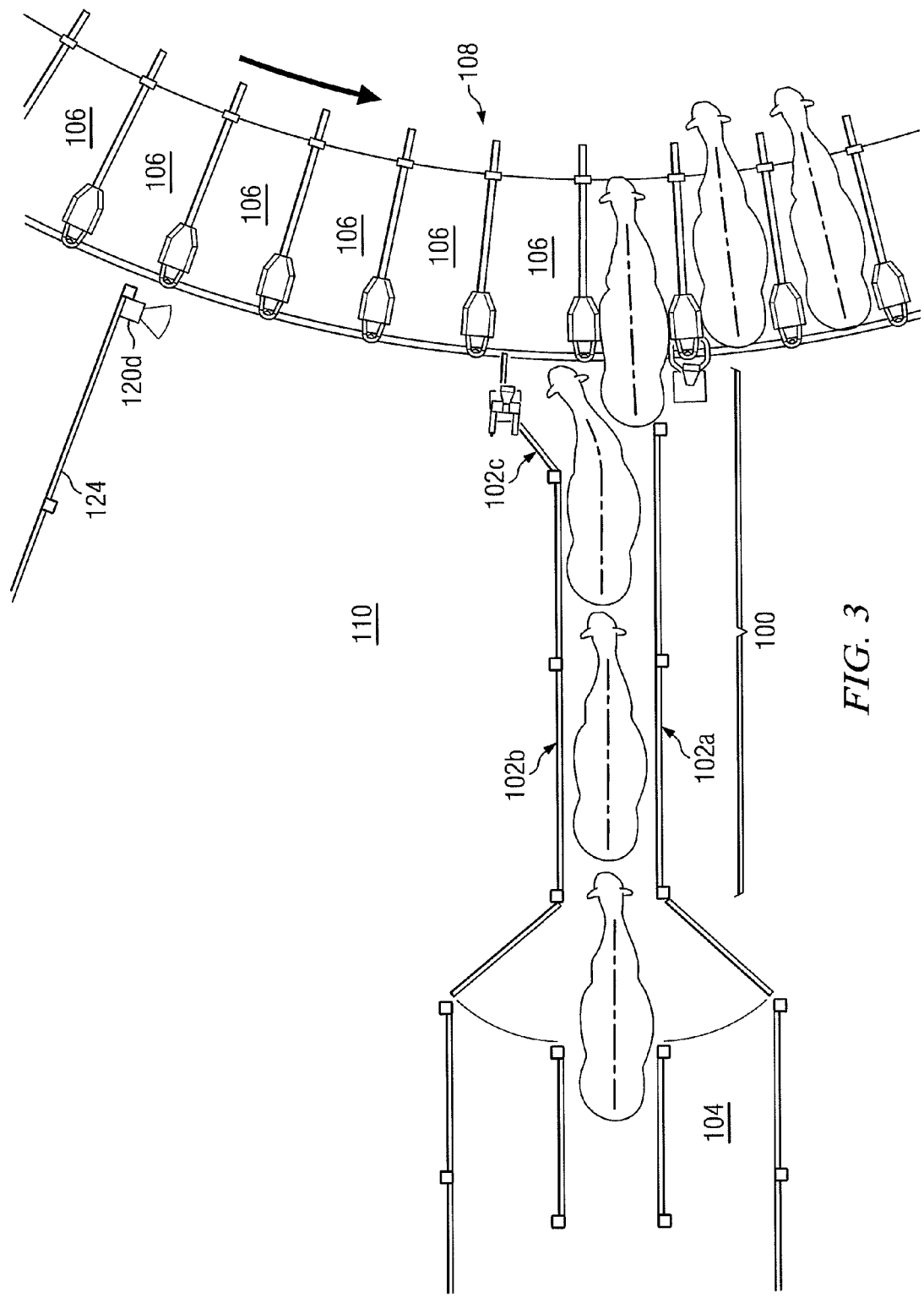
FIG. 3 illustrates an example use scenario for entrance lane depicted in FIG. 1, according to certain embodiments of the present disclosure.

FIG. 3 illustrates an example use scenario for entrance lane 100, according to certain embodiments of the present disclosure. In use, one or more dairy cows may enter entrance lane 100 from a holding pen 104. Because the width of entrance lane 100 at entrance 112 corresponds to the width of a single dairy cow (e.g., thirty inches to thirty-six inches), the dairy cows enter entrance lane 100 one at a time, thereby reducing the likelihood of congestion within entrance lane 100. Additionally, because flare wall 102c is oriented such that the width of entrance lane 100 at exit 114 corresponds to one and a half times to width at entrance 112 (e.g., forty-five to fifty-four inches), the dairy cows may be afforded additional room to line up with one or more stalls 106 of rotary milking platform 108, which may increase the speed and ease with which the dairy cows load into stalls 106. By reducing congestion and increasing speed and ease of loading, entrance lane 100 may increase the efficiency of the milking process, resulting in greater overall milk production.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system, comprising:
a first wall positioned substantially parallel to a second wall, a first end of the first wall and a first end of the second wall defining an entrance to a milking platform entrance lane;
a flare wall having a first end coupled to a second end of the second wall, the flare wall extending outwardly from the second wall at an angle with respect to the second wall, wherein a second end of the flare wall and a second end of the first wall define an exit from the milking platform entrance lane permitting dairy cows passing through the milking platform entrance lane to enter one or more stalls of an adjacent rotary milking platform having a first direction of rotation and a second direction of rotation;
a first gate coupled to the second end of the first wall, the first gate positioned substantially parallel to a first stall of the one or more stalls of the adjacent rotary milking platform;
a second gate coupled to the second end of the flare wall, the second gate positioned substantially parallel to a second stall of the one or more stalls of the adjacent rotary milking platform, the second gate operating independently from the first gate;
a first actuator coupled to the first gate, the first actuator impeding deflection of the first gate; and
a second actuator and a third actuator each coupled to the second gate, the second and third actuators impeding deflection of the second gate.

2. The system of claim 1, wherein the entrance to the milking platform entrance lane is positioned adjacent to a cattle holding pen such that dairy cows in the cattle holding pen may pass through the milking platform entrance lane.

3. The system of claim 1, wherein the second wall is positioned on a side of the milking platform entrance lane opposite the first direction of rotation of the rotary milking platform.

4. The system of claim 1, wherein the first, second, and third actuators are independently adjustable.

5. The system of claim 1, further comprising a first sensor positioned proximate to the first actuator, the first sensor operable to:
generate a trigger signal in response to a threshold amount of deflection of the first gate in a direction corresponding to the first direction of rotation of the rotary milking platform; and
communicate the generated trigger signal to a controller operable to initiate stopping of the rotary milking platform in response to the trigger signal.

6. The system of claim 1, further comprising a second sensor positioned proximate to the second actuator, the second sensor operable to:
generate a trigger signal in response to a threshold amount of deflection of the second gate in a direction corresponding to the first direction of rotation of the rotary milking platform; and
communicate the generated trigger signal to a controller operable to initiate stopping of the rotary milking platform in response to the trigger signal.

7. The system of claim 1, further comprising a third sensor positioned proximate to the third actuator, the third sensor operable to:
generate a trigger signal in response to a threshold amount of deflection of the second gate in a direction corresponding to the second direction of rotation of the rotary milking platform; and
communicate the generated trigger signal to a controller operable to initiate stopping of the rotary milking platform in response to the trigger signal.

8. The system of claim 1, further comprising a fourth sensor coupled to a wall of an exit pen positioned adjacent to the rotary milking platform, the fourth sensor operable to:
generate a trigger signal in response to detecting the presence of a dairy cow within a predefined proximity of the fourth sensor; and
communicate the generated trigger signal to a controller operable to initiate stopping of the rotary milking platform in response to the trigger signal.

9. The system of claim 1, wherein:
the first wall comprises a plurality of first posts and a plurality of first rails, each first rail extending between two adjacent first posts such that a side of the first rail is flush with a side of each of the two adjacent first posts; and
the second wall comprises a plurality of second posts and a plurality of second rails, each second rail extending between two adjacent second posts such that a side of the second rail is flush with a side of each of the two adjacent second posts.

10. A method, comprising:
positioning a first wall;
positioning a second wall, the first wall and the second wall being positioned such that a first end of the first wall and a first end of the second wall define an entrance to a milking platform entrance lane having a width in the range of thirty inches to thirty-six inches; and
coupling a first end of a flare wall to a second end of the second wall such that:
the flare wall extends outwardly from the second wall at an angle with respect to the second wall; and
a second end of the flare wall and a second end of the first wall define an exit from the milking platform entrance lane that permits dairy cows passing through the milking platform entrance lane to enter one or more stalls of an adjacent rotary milking platform having a first direction of rotation and a second direction of rotation;
coupling a first gate to the second end of the first wall, the first gate positioned substantially parallel to a first stall of the one or more stalls of the adjacent rotary milking platform;
coupling a second gate to the second end of the flare wall, the second gate positioned substantially parallel to a second stall of the one or more stalls of the adjacent rotary milking platform, the second gate operating independently from the first gate;
coupling a first actuator to the first gate, the first actuator impeding deflection of the first gate;
coupling a second actuator and a third actuator to the second gate, the second and third actuators impeding deflection of the second gate.

11. The method of claim 10, further comprising positioning the entrance to the milking platform entrance lane adjacent to a cattle holding pen such that dairy cows in the cattle holding pen may pass through the milking platform entrance lane.

12. The method of claim 10, further comprising positioning the second wall on a side of the milking platform entrance lane opposite the first direction of rotation of the rotary milking platform.

13. The method of claim 10, wherein the first, second, and third actuators are independently adjustable.

14. The method of claim 10, further comprising positioning a first sensor proximate to the first actuator, the first sensor operable to:
generate a trigger signal in response to a threshold amount of deflection of the first gate in a direction corresponding to the first direction of rotation of the rotary milking platform; and
communicate the generated trigger signal to a controller operable to initiate stopping of the rotary milking platform in response to the trigger signal.

15. The method of claim 10, comprising positioning a second sensor proximate to the second actuator, the second sensor operable to:
generate a trigger signal in response to a threshold amount of deflection of the second gate in a direction corresponding to the first direction of rotation of the rotary milking platform; and
communicate the generated trigger signal to a controller operable to initiate stopping of the rotary milking platform in response to the trigger signal.

16. The method of claim 10, comprising positioning a third sensor proximate to the third actuator, the third sensor operable to:
generate a trigger signal in response to a threshold amount of deflection of the second gate in a direction corresponding to the second direction of rotation of the rotary milking platform; and
communicate the generated trigger signal to a controller operable to initiate stopping of the rotary milking platform in response to the trigger signal.

17. The method of claim 10, further comprising coupling a fourth sensor to a wall of an exit pen positioned adjacent to the rotary milking platform, the fourth sensor operable to:
generate a trigger signal in response to detecting the presence of a dairy cow within a predefined proximity of the fourth sensor; and
communicate the generated trigger signal to a controller operable to initiate stopping of the rotary milking platform in response to the trigger signal.

18. The method of claim 10, wherein:
positioning the first wall comprises setting a plurality of first posts in the ground and attaching each of a plurality of first rails between two adjacent first posts, each first rail being attached to the two adjacent first posts such that a side of the first rail is flush with a side of each of the two adjacent first posts; and
positioning the second wall comprises setting a plurality of second posts in the ground and attaching each of a plurality of second rails between two adjacent second posts, each second rail being attached to the two adjacent second posts such that a side of the second rail is flush with a side of each of the two adjacent second posts.

19. A system, comprising:
a first wall positioned substantially parallel to a second wall, a first end of the first wall and a first end of the second wall defining an entrance to a milking platform entrance lane having a width in the range of thirty inches to thirty-six inches;
a flare wall having a first end coupled to a second end of the second wall, the flare wall extending outwardly from the second wall at an angle in the range of thirty-five degrees to forty-five degrees with respect to the second wall, wherein a second end of the flare wall and a second end of the first wall define an exit from the milking platform entrance lane having a width in the range of forty to fifty-four inches;
a first gate coupled to the second end of the first wall;
a second gate coupled to the second end of the flare wall, the second gate operating independently from the first gate;
a first actuator coupled to the first gate, the first actuator impeding deflection of the first gate;
a second actuator and a third actuator each coupled to the second gate, the second and third actuators impeding deflection of the second gate;
a first sensor positioned proximate to the first actuator, the first sensor operable to generate a trigger signal in response to a threshold amount of deflection of the first gate in a direction corresponding to a first direction of rotation a rotary milking platform positioned adjacent to the exit from the milking platform entrance lane;

a second sensor positioned proximate to the second actuator, the second sensor operable to generate a trigger signal in response to a threshold amount of deflection of the second gate in a direction corresponding to the first direction of rotation of the rotary milking platform; and a third sensor positioned proximate to the third actuator, the third sensor operable to generate a trigger signal in response to a threshold amount of rotational deflection of the second gate in a direction corresponding to a second direction of rotation of the rotary milking platform;

wherein:
the second wall is positioned on a side of the milking platform entrance lane opposite the first direction of rotation of the rotary milking platform;
the first gate is positioned substantially parallel to a first stall of the adjacent rotary milking platform;
the second gate is positioned substantially parallel to a second stall of the adjacent rotary milking platform; and
the first, second, and third sensors are each operable to communicate a generated trigger to a controller operable to initiate stopping of the rotary milking platform.

* * * * *